UNITED STATES PATENT OFFICE.

TREVOR M. CAVEN, OF BALTIMORE, MARYLAND, ASSIGNOR TO MARYLAND PRODUCTS COMPANY, A CORPORATION OF MARYLAND.

DIATOMACEOUS COMPOSITION.

1,305,522.     Specification of Letters Patent.     Patented June 3, 1919.

No Drawing.     Application filed April 11, 1917.   Serial No. 161,275.

*To all whom it may concern:*

Be it known that I, TREVOR M. CAVEN, a citizen of the United States, and resident of Baltimore, Maryland, have invented certain new and useful Improvements in Diatomaceous Compositions, of which the following is a specification.

It is the object of my invention to provide a composition material for use in making partitions, roofing, for insulating purposes, or for concrete work which will be light in weight and present a homogeneous structure, and in which Portland cement and infusorial earth, otherwise known as diatomaceous material, or kieselguhr constitute the ingredients.

In forming the composition I take diatomaceous silica in a dry state and add equal parts by weight of water. The material is then ground in a wet pan, *i. e.* a revolving pan in which a grinding wheel rotates with its periphery having a shearing action on the material, such as is used in the manufacture of stiff mud brick. The material is then transferred to an auger excluding press, such as is commonly termed an auger machine in the brick industry. After coming from the die of the extruding machine the material is cut to size for handling. Then it is put in a brick kiln of ordinary form and burned to the requisite temperature to give it sufficient hardness for use in the particular class of work for which it is intended. For light mixtures it is burned less than for use in heavy mixtures.

After burning it is put through an ordinary rock crusher and reduced. The crushed material is then subjected to the action of screening plates so as to screen the fines or sands from the coarse aggregates, such as are commonly used in concrete construction.

The general form of mixture, for floors, partitions, or ceilings, would be as follows:—

One part by weight of Portland cement to two parts calcined diatomaceous earth of a size to pass through a 16 mesh on a 60 mesh screen, and three parts of the coarse aggregate varying in size from that of a hazelnut to that of a walnut.

The Portland cement and the fine diatomaceous material is mixed in a dry state and then sufficient water added to give it the consistency desired.

The coarse aggregate is then added and the material is then ready for use as ordinary concrete would be used.

Proportions can be varied according to any concrete practice. I can leave out the coarse aggregate or use the coarse aggregate alone, that is, without the fine diatomaceous material.

The material weighs about one-eighth of the weight of ordinary concrete, has greater fire resisting and fire retarding qualities, due to the calcined infusorial earth, is a light insulating material and one which is fusible only at high temperatures.

It provides a composition having greater strength than any hard aggregate ordinarily used would give because of its property of holding the water a longer time than other aggregates which are non-porous, or less porous, the diatomaceous material holding the water a sufficient length of time for the proper setting of the cement, this being due to its porous characteristics.

It is a well known fact that all Portland cements carry a certain percentage of free lime, and it is for this reason that one of the aggregates in Portland cement concrete as usually made is sand. This is used in order to allow the free lime to act on the free silica and form calcium silicate. In using the calcined diatomaceous silica in a fine state, the free lime in the Portland cement is enabled to act upon it and form a calcium silicate. Calcium silicate always forms a certain percentage of the ingredients of limestone rock and there is obtained therefore by my process to all intents and purposes, the same chemical reaction as results in the formation of limestone rock and, therefore, the material produced by my invention has the characteristics of limestone rock. It is for this reason that sand is not required in making the concrete with diatomaceous silica and Portland cement.

What I claim is:—

1. The hereindescribed process consisting in grinding diatomaceous material in the presence of water to form a plastic mass, burning said material to the desired degree of hardness, crushing the calcined diatomaceous material and then mixing Portland cement therewith and adding water to make the composition, substantially as described.

2. The hereindescribed process consisting in grinding diatomaceous material in the presence of water to form a plastic mass, burning said material to the desired degree of hardness, crushing the calcined diatomaceous material, separating the fines from the coarse aggregate, mixing the fines and Portland cement together with water to the desired consistency and then adding the coarse aggregate, substantially as described.

In testimony whereof, I affix my signature.

TREVOR M. CAVEN.